April 25, 1961  L. F. FEHLNER  2,981,220
PARAVANE

Original Filed July 27, 1954  2 Sheets-Sheet 1

INVENTOR
LEO F. FEHLNER

BY

ATTORNEYS

April 25, 1961 L. F. FEHLNER 2,981,220
PARAVANE
Original Filed July 27, 1954 2 Sheets-Sheet 2
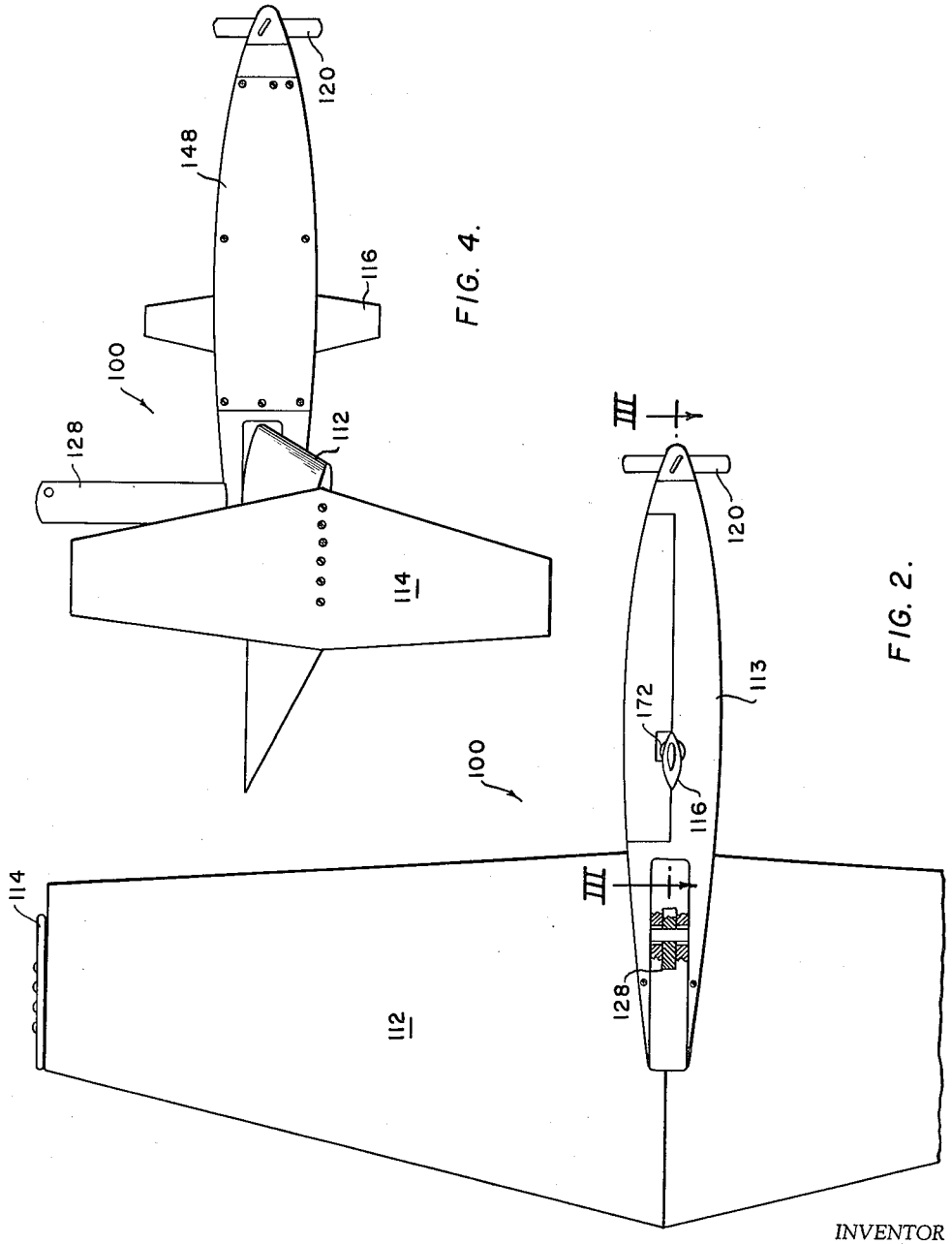
INVENTOR
LEO F. FEHLNER
BY
*B. L. Zanguil*
ATTORNEYS

United States Patent Office 2,981,220
Patented Apr. 25, 1961

2,981,220

PARAVANE

Leo F. Fehlner, Bethesda, Md.

Original application July 27, 1954, Ser. No. 446,185, now Patent No. 2,960,960, dated Nov. 22, 1960. Divided and this application Oct. 22, 1959, Ser. No. 854,992

11 Claims. (Cl. 114—235)

(Granted under Title 35, U.S. Code (1952), sec. 266)

The invention described herein may be manufactured and used by or for the Government of the United States of America for Governmental purposes without the payment of any royalties thereon or therefor.

The present invention relates to improvements in paravanes and more particularly to paravanes having cambered hydrofoils with high lift-to-drag and lift-to-weight ratios, and which maintain an accurate operational depth.

This application is a division of copending parent application Serial No. 446,185, filed July 27, 1954, now Patent No. 2,960,960.

Generally, paravanes have been towed by a towing vessel at a substantial angle rearward from the towpoint on the ship by a cable attached to the paravane body since presently used paravanes have a high inherent drag which causes the paravane to lag appreciably rearward of the towing point. Further, paravanes are usually equipped with a depth control device sensitive to static pressure changes to position the paravane at a specific operational depth. Some of these depth control devices in combination with the conventional paravane construction have caused the paravane to excessively oscillate or "hunt" in the water in finding an equilibrium towing position. This hunting action of the paravane produces dynamic loads which result in undesirable repeated stress on the towing cable, and in an erratic and inefficient manner of towing the device.

The present invention embodies a buoyant or non-buoyant paravane capable of carrying a cable quickly away from the ship and to be towed therefrom. The paravane utilizes a cambered hydrofoil, hereinafter called a paravane wing. The paravane wing is similar to an aircraft wing and is equipped with horizontal and lateral stabilizing surfaces. The cooperation of the aerodynamically designed cambered paravane wing with the stabilized surfaces causes the paravane to operate nearly abeam of the tow point on the ship, while the depth of the paravane is determined by controlling the attitude of the paravane relative to its direction of travel.

The cambered paravane wing operates in a similar manner as an aircraft wing in a banked attitude, wherein the inclination of the wing may be changed by varying the lift forces over the paravane's cambered surfaces through an induced change in the relative fluid flow pattern, thereon through the use of control surfaces, such as flaps, ailerons, elevators, or the like. In conjunction with the paravane wing, a depth control mechanism responsive to hydrostatic pressure is utilized for motivating the action of the control surfaces for differentially varying the fluid flow pattern and, consequently, the lift forces over the wing. The variation of the lift loading on the paravane wing, in response to changes in hydrostatic pressure, will produce corresponding variations in the attitude of the wing which will result in a corresponding change in the depth position of the paravane.

Further, the present invention embodies a paravane wherein the pulling force exerted by the towing vessel of the paravane, through the towline, will not be greatly affected by the drag forces of the paravane, and wherein the normal towing position will accordingly be substantially abeam of the vessel's towing point. The high resultant lift force inherent in the cambered design of the paravane wing will cause said wing to quickly tow-out, instead of being merely dragged along, and to assume the desired operational position at the end of a substantially taut cable.

The paravane wing is attached to the towline through a suitable coupling which will enable the paravane wing to pivot continuously about an axis concentric with the towline and to roll freely about a horizontal axis and pitch freely about an axis perpendicular to both the roll axis and the tow cable, which axes are fixed by operational requirements. Accordingly, the paravane wing will be operative free of any interfering action from the towline and will tend to remain substantially in its chosen equilibrium position, for independent reaction to changes in hydrostatic pressure. The paravane wing is provided with suitable stability surfaces to furnish a dampening and stabilizing effect which will substantially retard any oscillatory movement of said wing about its vertical or horizontal axis. The paravane wing will quickly tend to return to its equilibrium position of operation after any change in its attitude since it is solely responsive to changes in hydrostatic pressure and not to forces transmitted thereto through the attached towline other than tension.

The paravane wing of the immediate invention is provided with longitudinal stability about its towpoint through the provision of the suitable surface contour, or camber, wherein the resultant of all the hydrodynamic forces acting on said wing will pass through its towing point to substantially eliminate any undesirable unbalancing of said wing from its operative attitude and wherein deviations from this attitude result in moments which tend to restore the paravane to its operative attitude. By isolating the paravane wing in the manner heretofore discussed from any deleterious effects of unbalanced loads arising from the interaction of the hydrodynamic forces and the towline loads, the wing will be free to assume its equilibrium position and will be responsive to small changes in hydrostatic pressures. These hydrostatic pressure changes will be translated through a simple mechanism into movement of suitable control surfaces regulating the depth of the paravane.

Hence, a broad object of the present invention is to provide a paravane constructed with suitable cambered hydrofoil sections having a high lift-to-drag ratio.

A further object is the provision of a pressure sensitive device highly responsive to small changes in hydrostatic pressure and having simple translating mechanism for actuating control surfaces which determine the attitude of the paravane in the water through suitable modification of the fluid flow over the paravane's surface.

Another object of the present invention is the provision of a paravane which when towed on the end of a cable assumes an equilibrium position of tow substantially abeam of the towing vessel at a specified depth and continues to remain in this position over a specified speed range.

A further object of the invention is the provision of a paravane having an airplane-type wing and movable control surfaces for controlling the depth of the paravane.

Still another object is to provide a paravane having a high lift-to-weight ratio.

Another object is the provision of a paravane wherein the depth of the paravane during towing is a function of the attitude of the hydrofoil relative to its direction of movement.

An object of the present invention is the provision of a paravane that during towing will have longitudinal stability about its towline attachment point.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 2 is a plan view, partly in section, of a modification of an embodiment of the invention showing an airplane-type paravane wing having a streamlined body with elevator-type control surfaces attached thereto;

Figure 4 is a side view of the modification shown in Figure 2 showing the paravane in its operative attitude.

Figure 1:
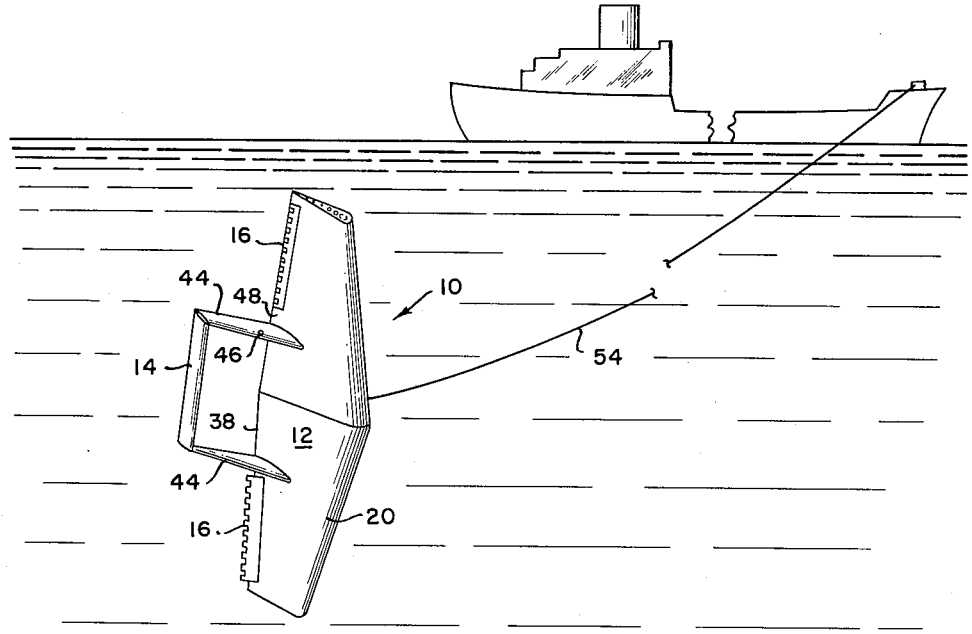
Figure 1 is a perspective view of a preferred embodiment of the invention, in an exaggerated scale for purposes of clarity, showing an airplane-type paravane wing in towing position relative to a towing vessel.

Referring now to the drawings, there is shown in Figure 1 a preferred embodiment 10 of the invention comprising a cambered hydrofoil or paravane wing 12, as referred to hereinafter, with a stability surface 14 and flaps 16 integral with the wing. The flaps 16 are alternately actuated, as shown in the parent application, by a depth controlled mechanism housed within the paravane wing 12 and exposed to the static pressure of the fluid in which it is immersed in a manner herein disclosed. The depth control mechanism includes an adjustable member that causes one or the other of the flaps 16 to operate when the depth of submergence of the paravane deviates from a predetermined depth corresponding to the particular adjustment of the adjustable member.

The paravane wing 12 may be formed in any suitable geometric shape; however, in the preferred embodiment said wing is constructed with a uniform sweepback about its longitudinal axis and with a top and bottom cambered surface, as described in the parent application. The flaps 16 are connected to the depth control mechanism through flap shafts automatically operated by the depth control mechanism.

The longitudinal stability surface 14 is spaced from the hydrofoil 12 and supported in a fixed relation thereto by supporting struts 44, to thereby remove said surface from the deleterious effect of the slipstream of the fluid flow over the paravane wing so as to provide a measure of longitudinal stability in excess of that provided by the wing 12. The struts 44 are shaped so as to form lateral stability surfaces which provide lateral stability and damping and are hollow in construction and filled with a buoyant material with the exception of conduits for communicating the hydrostatic pressure from pressure vents 46 provided on their surfaces, to the depth control mechanism. The stability surface 14, also filled with the buoyant material, and its supporting struts 44 are formed with suitable streamlined contours so as to present an efficient hydrodynamic shape to the fluid flow about the paravane wing 12, and to thus minimize any possible interference with the flow over said paravane wing and to minimize the drag. To facilitate maintenance, the paravane's top surface 20 is provided with a number of conventionally constructed accessible covered wells 48 to provide the means for periodical inspections of the flap shafts and of the depth control mechanism.

In the operation of the preferred embodiment 10, the paravane wing 12 is adjusted to operate at a specific depth within certain design limits by the suitable adjustment of the depth control mechanism. The paravane wing is coupled to the tow line 54 by a suitable connection to the tow point of the paravane. The paravane wing is placed in a suitable launcher so that the stability surface 14 is facing away from the towing vessel when launched in its operative position in the water.

In launching the preferred embodiment, the paravane wing 12 is jettisoned or dropped from the towing vessel into the water as far away from the side of the vessel as possible to insure that the paravane does not hit the vessel's side and to give the paravane an initial attitude on leaving the launcher which causes the paravane to enter the surface of the water and quickly tow out into normal operative position.

In the normal operative towed position, the depth of the paravane is determined by controlling the vertical attitude of the paravane wing 12 relative to its direction of travel. The attitude of the wing is controlled by the variation from a predetermined pressure, set by the adjustable member of the depth control mechanism, of the hydrostatic pressure of the water adjacent the pressure taps 46, which is received by the depth control mechanism, to independently and alternately actuate the flaps 16 adjacent the trailing edge 38 of said wing 12 and in addition for large changes in operative depth. The hydrostatic pressure is received through the pressure taps 46, located at a suitable distance from the fluid flow over the paravane wing to escape any pressure disturbances created therefrom, and communicated through passageways provided in the buoyant material within struts 44.

Thus, any change in hydrostatic pressure will cause the paravane to react thereto by a relative change in the banking characteristics of the paravane through a variation in the lift forces over the surface of the paravane wing 12. The variation in lift is produced through a change in the fluid flow pattern over a portion of the paravane wing 12 due to the action of the actuated flap 16 on the path of the fluid flow to reduce the lift and increase the drag over said portion of the paravane wing.

Figure 3:
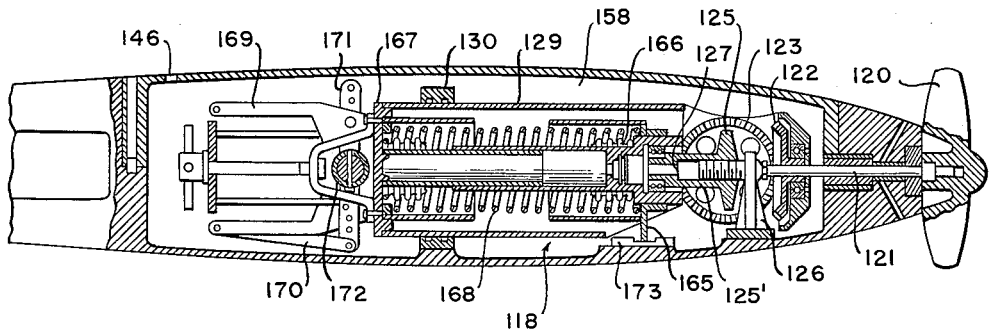
Figure 3 is a sectional view of the modification shown in Figure 2, taken on a line III—III looking in the direction of the arrows.

A modification 100 of the present invention, illustrated in Figures 2–4, comprises a cambered paravane wing 112 provided with a streamlined body 113 secured thereto along the center line of said wing. The wing 112 is provided with lateral stabilizers 114, functioning in a manner similar to the stabilizer 44 of the preferred embodiment, perpendicularly attached to each wing tip. The depth attitude of the paravane is determined by a pair of horizontal elevators 116 pivotly mounted on the body 113, forward of the wing 112, and controlled by a depth control mechanism 118 provided within a chamber 158 formed within the body 113. The depth control mechanism 118 is powered by a fluid driven propeller 120 rotatably mounted on the front end of the body 113. As the paravane is towed, the reaction of the water will cause the propeller to turn, and if the paravane is not at the predetermined depth the propeller through its shaft (as will be more fully explained) will cause the elevators to bring the paravane to the correct depth. The paravane is connected to the towing vessel by a towing cable 54 attached to a tow post 128 pivotally secured to the body 113 at the fore and aft position of the center of gravity of the paravane, and in a manner similar to that described for the tow cable and tow post in the parent application.

The propeller 120 is secured on a shaft 121 extending within the depth control chamber 158 and provided with a beveled gear 122 slidably splined thereon. The beveled gear 122 meshes with diametrically opposed beveled gears 123 (only one of which is shown in Fig. 3), to drive them in opposite directions. The beveled gears 123 are formed with facing plane surfaces near the centers thereof to frictionally engage opposite sides of a friction disc 125 having an axially extending hollow hub 125'. An end of the friction disc 125 is journaled through its hub 125' in a support 165 of the pressure responsive bellows 166 and its other end is threadedly engaged with a fixed shaft 127 secured to the body 113 through a fixed post 126. The end 165 cooperates with a limit stop member 173 to limit the longitudinal motion of the friction disc 125 relative to the fixed shaft 127. The opposite end 167 of the slidable bellows 166 is connected to the gears 122, 123, and to a yoke 169 through a suitable unitary frame member 129 slidably mounted within a frictionless guide ring 130 fixed to the body 113.

A compression spring 168 is concentrically mounted with respect to the bellows 166 to bias the ends 165 and 167 away from each other. The yoke 169 is coupled to the elevators 116 through a link 170 pivotally fixed to the yoke 169 and to a member 171 which is fixed to a rotatable shaft 172 on which are suitably mounted the elevators 116. The hydrostatic pressure port 146 is provided on the body 113, in a region where super-velocities of fluid are not expected, to serve as a hydrostatic pressure inlet to the chamber 158 for operative communication with the bellows 166. The depth control chamber 158 is provided with a removable closure member 148 conforming to the streamlined contours of the body 113.

In the operation of the modification 100 of the invention, the cable 54 is attached to the tow post 128 and launched in a manner similar to the launching of the preferred embodiment 10, wherein the paravane wing is in a vertical position and the stabilizers 114 are in a horizontal attitude. The fluid driven propeller 120 rotates the shaft 121 to drive the beveled gear 122 and the beveled gears 123 in opposite directions. The gears 123 operatively engage the friction disc 125 through the plane surfaces provided near the respective center. At a predetermined depth, the friction disc 125 contacts the gears 123 at their centers and consequently no frictional force is applied to disc 125. The friction disc 125 is rotatably secured to the pressure responsive bellows 166, and in threaded engagement with the fixed shaft 127. The end 167 of the slidable bellows 166 is connected to the gears 123 and 122 through the unitary frame 129 to form a unitary slidable assembly.

The yoke 169 is secured to the bellows' end 167 for longitudinal movement with the bellows 166 and spring 168, and thus with the unitary frame member 129.

Any change in hydrostatic pressure communicated to the depth control mechanism 118 will be transmitted through the unitary frame member 128 to the link 169 and through linkage 170 and 171 to the elevator shaft 172. An increase in depth by the paravane will reduce the length of the bellows 166, and movement of the end 167 will longitudinally displace the gears 123, attached to frame member 129, relative to the friction disc 125 and thereby cause said disc 125 to threadedly rotate relative to the fixed shaft 127 to properly adjust the position of the elevator shaft 172. Thus, changes in static pressure, causing deflections of the bellows 166, will be taken up by the screw connection between the friction disc 125 and the fixed shaft 127, to thereby improve the depth keeping characteristics of the paravane.

The longitudinal motion of the bellows is transmitted to the elevators 116 through the longitudinal movement of the yoke 169 fixed to the frame 129 and coupled to the shaft 172 through the intermediate crank 171 and pivot link 170, to thereby rotate the elevators 116 for control of paravane depth. The rotation of the elevators produces a relative change in the angle of attack of the elevators, to thereby produce a relative change in the lift forces over said elevators 116, to thereby control the rise or fall of the paravane relative to its longitudinal axis. As the paravane approaches the correct depth, the bellows 166 elongate to move the gears 122 and 123, and in turn, the elevators 116 in the opposite direction, until the paravane is balanced at the desired depth without undesirable "hunting" action.

In accordance with the present invention, a paravane is provided that is towed by a cable from a towing vessel, which in operation quickly assumes an equilibrium position at a specified depth and continues to remain in this position over a specified speed range. Accordingly, a much more stable device for maintaining a cable substantially abeam of the towing ship is provided through the action of the depth control mechanism which prevents hunting, and through the high lift-to-drag design of the paravane wing which is formed with cambered surfaces to provide longitudinal stability about the paravane's tow point.

The preferred embodiment and the modifications of the present invention are similar in that aerodynamic principles are employed to obtain a high lift paravane wing with an inherent low drag and with a high lift-to-weight ratio for providing a very efficient paravane, which will maintain a towline substantially abeam of the vessel's tow point. The embodiments of the present invention utilize cambered paravane wing surfaces designed according to the non-dimensional coordinants presented herein, and utilize a depth control mechanism responsive to changes in hydrostatic pressure for actuating a mechanism operatively coupled to control surfaces associated with the paravane wing. Suitable actuation of the control surfaces produces a modification of the fluid flow pattern about the paravane which results in a variation of the paravane's lift and drag components which determine its attitude in the water and, consequently, its depth.

Obviously many modifications and variations of the present invention are possible in the light of the above teachings. It is therefore to be understood, that within the scope of the appended claims, the invention may be practiced otherwise than as specifically described.

What is claimed is:

1. A paravane to be towed through water, comprising a streamlined body, a cambered paravane wing secured to an end of said streamlined body, the longitudinal axis of said streamlined body coinciding in direction with a center line of said paravane wing, stability means fixed to said wing and extending perpendicularly therefrom, adjustable fluid flow control means at said streamlined body for controlling the position of said paravane in the water, a depth control device secured within said streamlined body, and having a pressure sensitive device responsive to hydrostatic pressure changes at a point of said paravane, said depth control device including operable means for adjusting said control means, said operable means being operable in accordance with hydrostatic pressure responses of said pressure sensitive device.

2. A paravane as defined in claim 1 wherein said stability means comprising surfaces at the ends of said paravane wing substantially perependicular thereto.

3. A paravane as defined in claim 1 wherein said control means comprising surfaces extending from said streamlined body substantially perpendicularly to said paravane wing.

4. A paravane as defined in claim 1 wherein said pressure sensitive device comprises an inlet exposed to ambient fluid about said paravane but so as to be substantially free of pressure disturbances created solely by said paravane wing.

5. A paravane to be towed through water substantially abeam from a towing vessel, comprising a cambered paravane, a tow post for receiving a tow cable, said tow post being substantially in line with the center of gravity of said paravane, a streamlined body having an end secured to said paravane wing with the longitudinal axis of said streamlined body coinciding in direction with a center line of said paravane wing, stability means and adjustable fluid flow control means for controlling the position of said paravane in the water, said fluid flow control means controlling the flow of fluid relative to said paravane, means responsive to the speed of said paravane through the water, a depth control means responsive to the depth of said paravane in the water, and means interconnecting said speed responsive means and depth control means to said adjustable fluid flow control means.

6. A paravane as defined in claim 5 wherein said speed responsive means comprises a propeller at an end of said streamlined body opposite the first said end.

7. A paravane to be towed through water substantially abeam from a towing vessel, comprising a cambered paravane, a tow post for receiving a tow cable, said tow post being substantially in line with the center of gravity of said paravane, stability means and adjustable fluid flow control means for controlling the position of said paravane in the water, said fluid flow control means controlling the flow of fluid relative to said paravane, means responsive to the speed of said paravane through the water, a depth control means responsive to the depth of said paravane in the water, and means interconnecting said speed responsive means and depth control means to said adjustable fluid flow control means to control the adjustment of said fluid flow control means.

8. A paravane adapted to be towed by a cable substantially abeam of a towing vessel, comprising a paravane wing having cambered lower and upper surfaces, a streamlined body secured to said paravane, tow line coupling means pivotally affixed to said streamlined body adapted to receive a tow cable, a plurality of stabilizers secured to said paravane wing substantially perpendicular thereto, elevator means rotatively secured to said body for controlling the attitude of the paravane, depth control means secured within said body, propeller means rotatively mounted on the nose of said body and coupled to said depth control device, gear means connected to said propeller and driven thereby, second gear means meshing with said first gear means and having plane surfaces near their center portions, a friction disc engaging said second gear means at their centers, said friction dic being coupled to said depth control device, a threaded shaft fixed relative to said body and threadedly engaging thereon said friction disc, said depth control means having a bellows with one end connected to said friction disc and a second end coupled to said first and second beveled gear means, the second end of said bellows having yoke means secured thereto for longitudinal movement therewith, and mechanical means coupling said yoke and said elevators for actuation of said elevators in response to the action of said bellows.

9. A paravane for carrying a cable substantially abeam from a towing vessel, said paravane comprising a hydrofoil having major surfaces thereof cambered according to given non-dimensional coordinates in a manner as to produce inherently low drag and relatively high lift-to-weight ratio when towed in a normal substantially vertical operative position to thereby maintain the cable substantially abeam of the towing vessel, a streamlined body extending forwardly of the center of the hydrofoil, movable control surfaces extending from said body for modifying fluid flow patterns about said cambered surfaces, and depth control mechanism responsive to changes in hydrostatic pressure on the hydrofoil and operatively coupled to the control surfaces for moving such surfaces relative to the hydrofoil to thereby modify the fluid flow pattern about the cambered surfaces of the hydrofoil for producing a variation in lift and drag components and corresponding changes in attitude and depth of the paravane.

10. A paravane for carrying a cable substantially abeam from a towing vessel, said paravane comprising a hydrofoil having major surfaces thereof cambered according to given non-dimensional coordinates in a manner as to produce inherently low drag and relatively high lift-to-weight ratio when towed in a normal substantially vertical operative position to thereby maintain the cable substantially abeam of the towing vessel, a streamlined body extending forwardly of the center of the hydrofoil, movable control surfaces extending from said body for modifying fluid flow patterns about said cambered surfaces, speed responsive means operable in accordance with the speed of said paravane, and depth control mechanism responsive to changes in hydrostatic pressure on the hydrofoil, said speed responsive means and said depth control mechanism being operatively coupled to the control surfaces for moving such surfaces relative to the hydrofoil to thereby modify the fluid flow pattern about the cambered surfaces of the hydrofoil to produce a variation in lift and drag components and corresponding changes in attitude and depth of the paravane.

11. A paravane for carrying a cable substantially abeam from a towing vessel, said paravane comprising a hydrofoil having major surfaces thereof cambered according to given non-dimensional coordinates in a manner as to produce inherently low drag and relatively high lift-to-weight ratio when towed in a normal substantially vertical operative position to thereby maintain the cable substantially abeam of the towing vessel, a streamlined body extending forwardly of the center of the hydrofoil, a speed-responsive propeller extending from an end of said body, flow control means for controllably modifying the fluid flow pattern about the cambered surfaces of said hydrofoil, and depth control mechanism responsive to changes in speed of said propeller and operatively coupled to said flow control means for controlling said flow control means.

References Cited in the file of this patent

UNITED STATES PATENTS

| 1,358,358 | Burney | Nov. 9, 1920 |
| 2,572,442 | Burnelli | Oct. 23, 1921 |
| 2,681,773 | Rethorst | June 22, 1953 |